United States Patent
Baker et al.

(10) Patent No.: US 7,190,786 B2
(45) Date of Patent: Mar. 13, 2007

(54) TELEPHONE WITH REMOVABLE DSL CARTRIDGE

(75) Inventors: Jess Baker, Stockbridge, GA (US); John J. Horton, Acworth, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 465 days.

(21) Appl. No.: 09/965,398

(22) Filed: Sep. 28, 2001

(65) Prior Publication Data
US 2003/0063737 A1  Apr. 3, 2003

(51) Int. Cl.
*H04M 1/00* (2006.01)

(52) U.S. Cl. .............................. 379/428.01; 379/90.01; 379/93.37; 379/428.04; 307/119; 439/133; 439/344; 439/638

(58) Field of Classification Search ........... 379/428.01, 379/428.04, 90.01–93.37; 307/119; 439/133, 439/344, 638
See application file for complete search history.

(56) References Cited

U.S. PATENT DOCUMENTS

| | | | |
|---|---|---|---|
| 4,061,411 A * | 12/1977 | Gumb et al. ................ | 439/344 |
| 5,163,089 A * | 11/1992 | Kotani et al. .......... | 379/100.02 |
| 5,414,768 A * | 5/1995 | McKinnon et al. .... | 379/428.04 |
| 5,877,565 A | 3/1999 | Hollenbach et al. | |
| 6,174,205 B1 * | 1/2001 | Madsen et al. ............. | 439/638 |
| 6,408,068 B1 * | 6/2002 | Larson et al. .......... | 379/357.01 |
| 6,904,149 B2 * | 6/2005 | Keenum et al. ............ | 379/445 |

OTHER PUBLICATIONS

Corning, Toolless Wall-mount Distributed Microfilter, Jul. 2001.*
PCT/US02/30744 PCT International Search Report Bell South Intellectual Property Corporation.

* cited by examiner

*Primary Examiner*—Quynh H. Nguyen
(74) *Attorney, Agent, or Firm*—Withers & Keys, LLC

(57) ABSTRACT

A telephone including a removable DSL filter cartridge is disclosed. The telephone includes a location adapted to receive a filter cartridge. The filter cartridge is designed to fit inside the location provided on the telephone. The filter cartridge includes a first end that electrically connects the filter cartridge to the telephone and a second end that faces outwards. The second end includes a DSL port so that users can plug DSL devices directly into the port. The filter cartridge includes a DSL filter to help eliminate unwanted noise on the telephone line and the filter cartridge is designed to be easily removable.

18 Claims, 4 Drawing Sheets

TELEPHONE WITH REMOVABLE DSL CARTRIDGE

BACKGROUND

1. Field of the Invention

The present invention relates generally to telephones, and more particularly, to telephones capable of providing a DSL connection.

2. Background of the Invention

DSL (Digital Subscriber Line) service provides customers with high speed access to the Internet and other computer networks. Customers who request DSL service often contact a DSL service provider who then either dispatches a technician to the customer's dwelling to install the equipment necessary to support DSL service, or sends a self-install kit to the customer with instructions that include the necessary installation procedures.

Regardless of exactly how the DSL service installation is performed, one required step of the DSL installation is to provide a filter for every telephone in the dwelling. A filter is required to block unwanted noise generated by DSL signals from interfering with conventional voice telephones.

Generally, local telephone companies provide four wires for each dwelling. Two wires or leads are used for conventional POTS (Plain Old Telephone Service), leaving two remaining wires. It has been observed that most customers place a conventional telephone near the point where DSL service is provided. For example, if DSL service is accessed from a computer placed in a home office, many customers will also have a conventional telephone in the home office as well, and often the conventional telephone will be placed near the computer that is used to access DSL services.

In those instances where a telephone is placed near the access point for DSL services, a splitter is required to split the conventional telephone wires from the DSL wires. The splitter is normally mounted on the wall where the DSL line enters the dwelling. The splitter is used to split the line and thus provide a DSL connection and a telephone connection.

SUMMARY OF THE INVENTION

The present invention is directed to a telephone that provides a DSL connection in addition to functioning as a normal telephone. The telephone includes a removable DSL filter cartridge. The telephone includes a location or place that is designed to receive a filter cartridge. The filter cartridge is designed to fit inside the location provided on the telephone. The filter cartridge includes a first end that electrically connects the filter cartridge to the telephone and a second end that faces outwards. The second end includes a DSL port so that users can plug DSL devices directly into the port. The filter cartridge includes a DSL filter to help eliminate unwanted noise on the telephone line. The filter cartridge assembly is designed to be easily removable.

Additional features and advantages of the invention will be set forth in the description which follows, and in part will be apparent from the description, or may be learned by practice of the invention. The objectives and advantages of the invention will be realized and attained by the structure and steps particularly pointed out in the written description, the claims and the drawings.

DETAILED DESCRIPTION OF THE PREFERRED EMBODIMENTS

Figure 1:
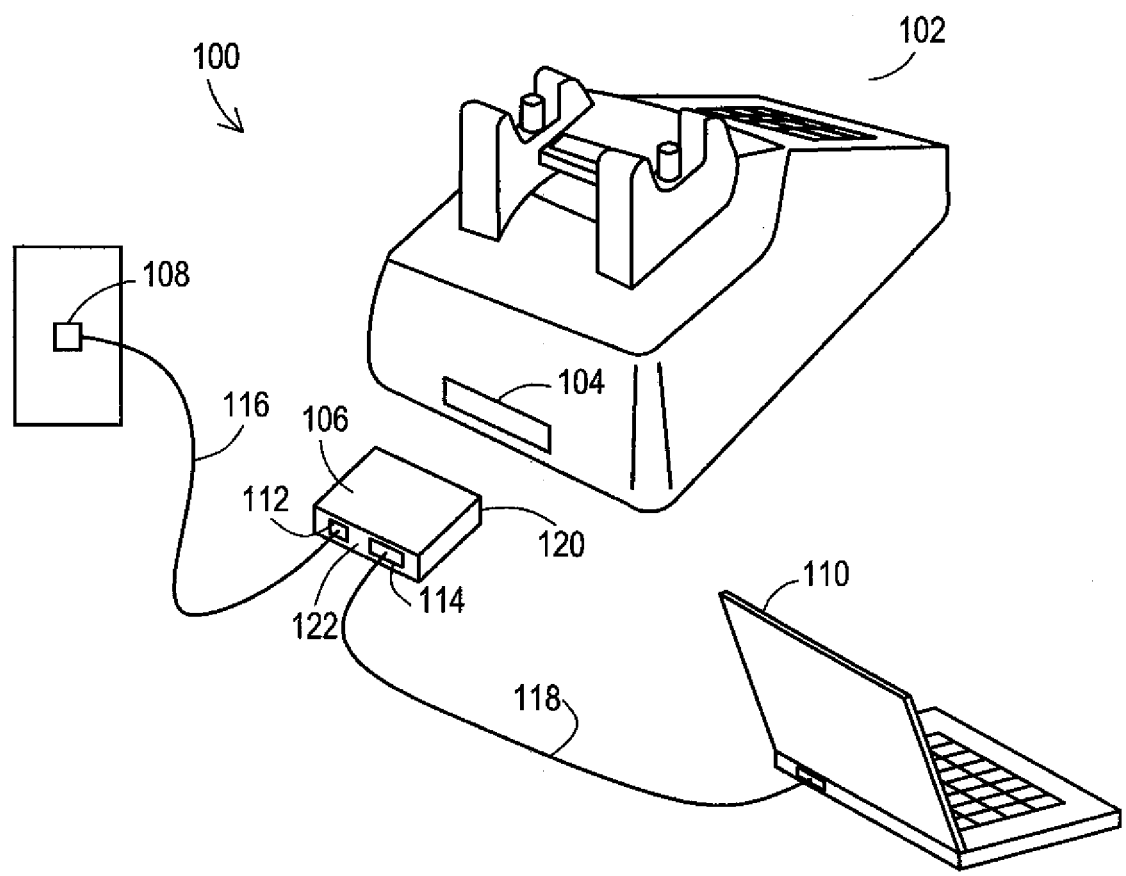
FIG. 1 is an exploded isometric view of a preferred embodiment of a telephone in accordance with the present invention.

FIG. 1 shows a preferred embodiment of a telephone 102 in accordance with the present invention. Telephone 102 can be connected to a wall jack 108 and a computer 110 or any device that uses DSL services. Telephone 102 includes a location 104 that is designed to receive a filter cartridge 106. Location 104 can be placed in any desired part of telephone 102. Preferably, location 104 is placed at the rear of telephone 102 as shown in FIG. 1. In another embodiment, location 604 is placed on a side of telephone 602 (see FIG. 6).

Figure 2:
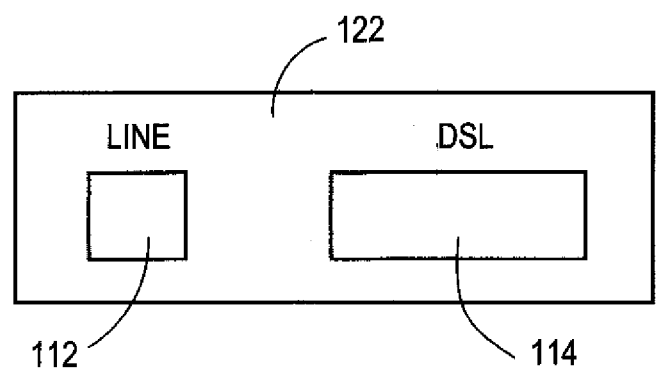
FIG. 2 is an enlarged view of an end of a preferred embodiment of a filter cartridge in accordance with the present invention.

Referring to FIGS. 1 and 2, filter cartridge 106 includes a first end 120 that is designed to enter a location 104 of telephone 102. Filter cartridge 106 also includes a second end 122 that faces in a different direction than first end 120 and second end 122 is preferably exposed when filter cartridge 106 is installed in telephone 102. Preferably, the substantial remainder of filter cartridge 106 is received in location 104 and is not visible after being installed.

Second end 122 preferably includes two connectors, a line connector 112 and a DSL connector 114. Line connector 112 is adapted to receive a line 116 that places filter cartridge 106 in communication with wall jack 108. Likewise, DSL connector 114 is adapted to receive a DSL line 118 that places filter cartridge 106 in communication with a device adapted to receive DSL communications. A computer 110, is an example of a device that is adapted to receive DSL communications. Computer 110 would likely include a DSL modem or other device that would permit computer 110 to use DSL communications.

Figure 3:
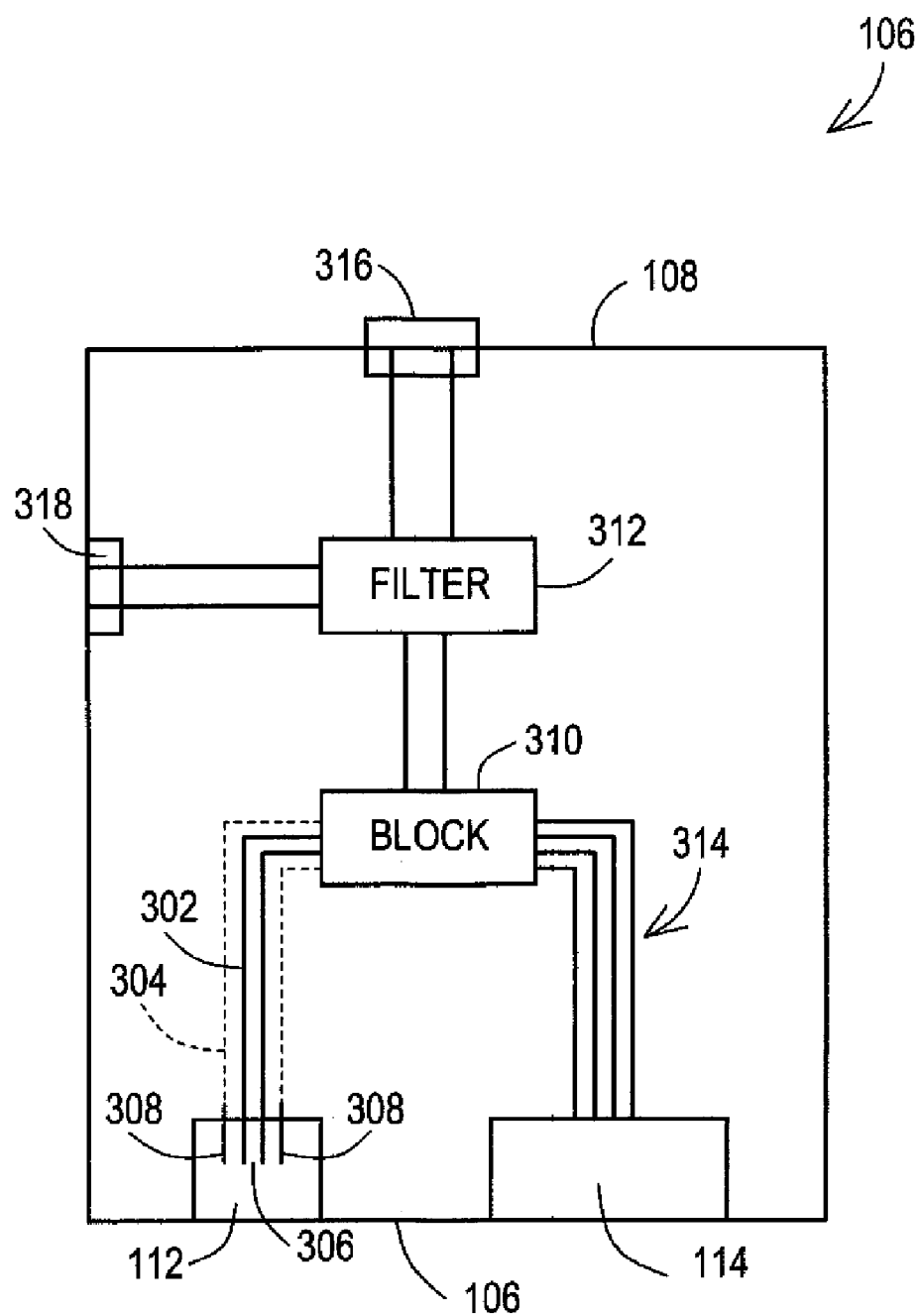
FIG. 3 is a schematic diagram of a preferred embodiment of a filter cartridge in accordance with the present invention.

FIG. 3 shows a schematic diagram of a preferred embodiment of a filter cartridge 106. As discussed above, line connector 112 communicates with wall jack 108 (see FIG.

1). Generally, an inner pair 306 and an outer pair 308 of leads are available. Most communications services are provided on the inner pair 306 of leads, so conductors 302 that place block 310 in communication with line connector 112 is preferred. However, in some cases, outer leads 308 provide communications services, and outer conductors 304 may be provided to place block 310 in communication with line connector 112. In another embodiment, both the inner conductors 302 as well as the outer conductors 304 are provided so that, regardless of which pair of leads the communications services are provided, block 310 will be placed in communication with line connector 112.

Filter cartridge 106 preferably includes a block 310. Block 310 acts to split an incoming signal from either the inner pair of conductors 302 or the outer pair of conductors 304 or both and place both filter 312 and DSL connector 114 in communication with the incoming signal. DSL connector 114 is designed to permit filter cartridge 106 to communicate with a device that can accept a DSL signal. One example of such a device is a DSL modem. Because DSL modems and other devices that can accept a DSL signal use either the inner or outer pair of leads, it is preferred that both the inner and outer pairs of conductors are provided in DSL conductor 314 disposed between block 310 and DSL connector 114. In this way, regardless of which pair, either the inner or the outer, of leads is used by the subsequent DSL device or modem, that device or modem will receive a signal from filter cartridge 106.

Filter 312 is a standard DSL filter and can remove unwanted noise and signals from communicating with an electrical connector 316 or 318. In a preferred embodiment, a first end 120 of filter cartridge 106 includes an electrical connector 316 that is designed to engage a corresponding electrical connector (not shown) disposed within location 104. In other embodiments, the electrical connectors of the filter cartridge 106 could be located on any face or surface of the filter cartridge and provisions would be made in telephone 102 to suitably engage those electrical connectors. For example, an electrical connector 318 could be disposed on a side of filter cartridge 106. Electrical connector 318 could be used as an alternative to electrical conductor 316 or could be used in addition to electrical conductor 316. Electrical connector 316 and/or 318 permit telephone 102 (see FIG. 1) to communicate with filter cartridge 106 and therefore, with wall jack 108. In this way, conventional telephone service with possible DSL noise removed is provided to telephone 102.

After filter cartridge 106 has been installed in telephone 102, second end 122, which includes a DSL connector 114, is visible and readily accessible. This arrangement provides a convenient system for providing DSL access. Users can plug DSL devices directly into telephone 102 and do not have to search for inconvenient DSL connectors located in walls, behind furniture, and other hard to reach locations.

Preferably, filter cartridge 106 is designed in a way that makes it easy to remove the filter cartridge 106 from telephone 102. Many different options and possibilities could be utilized.

Figure 4:
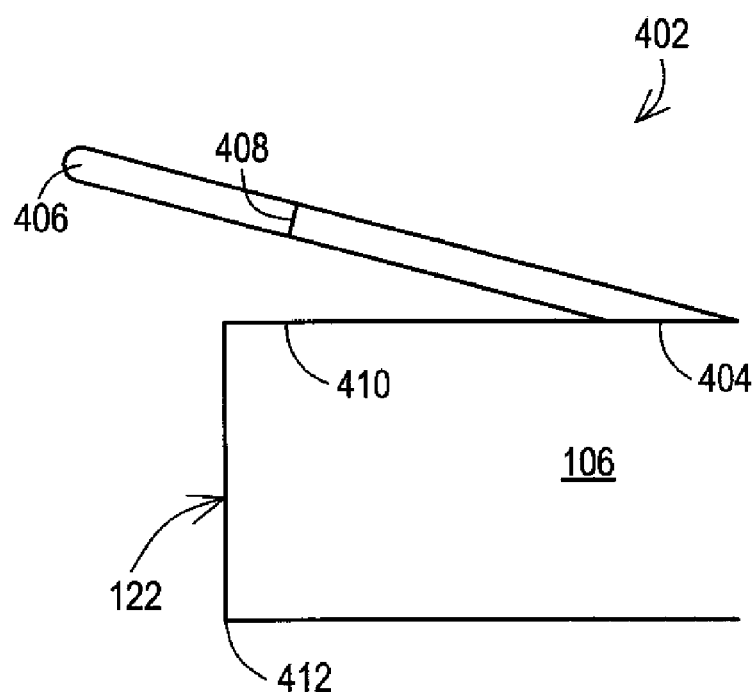
FIG. 4 is a schematic diagram of a side view of preferred embodiment of a latch in accordance with the present invention.
Figure 5:
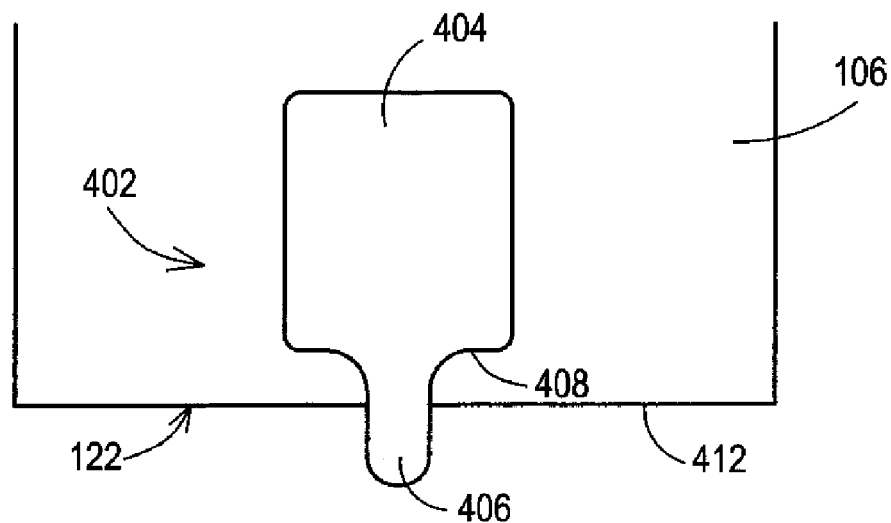
FIG. 5 is a schematic diagram of a top view of preferred embodiment of a latch in accordance with the present invention.

FIGS. 4 and 5 show a preferred embodiment of one possible arrangement that can be used to provide easy installation and removal of filter cartridge 106. Filter cartridge 106 includes a latch 402 that includes a first end 406 and a second end 404. Preferably, second end 404 of latch 402 is associated with an upper surface 410 of filter cartridge 106. In an exemplary embodiment, the second end 404 is fixedly attached to upper surface 410. The first end 406 is disposed opposite second end 404 and preferably extends axially beyond leading edge 412 of the second end 122 of filter cartridge 106.

Preferably, latch 402 is biased in a direction away from upper surface 410 and latch 402 includes at least one shoulder 408. Preferably, the bias is achieved by elastic deformation of latch 402. Preferably, a matching shoulder and void (not shown) is provided in location 104 (see FIG. 1) where the void accommodates first end 406 and where the matching shoulder opposes shoulder 408. When filter cartridge 106 is inserted into location 104 (see FIG. 1), latch 402 is initially pressed towards upper surface 410 until latch 402 returns to its biased, raised position when first end 406 enters the void. In this position, shoulder 408 engages a mating shoulder disposed in location 104 and securely retains filter cartridge 106 in position.

To remove filter cartridge 106, a user presses first end of latch 406 towards upper surface 410 until shoulder 408 clears the mating shoulder disposed in location 104. Preferably, first end 406 extends beyond the leading edge 412 of second end 122 to facilitate operation of latch 402. When this occurs, filter cartridge 106 is free and can be easily removed from location 104.

Figure 6:
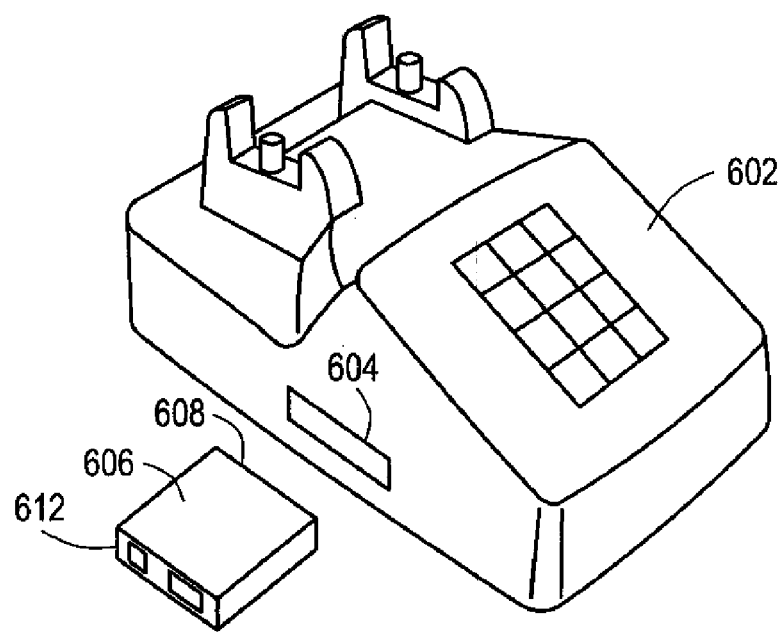
FIG. 6 is an exploded isometric view of another embodiment of a telephone in accordance with the present invention.
Figure 7:
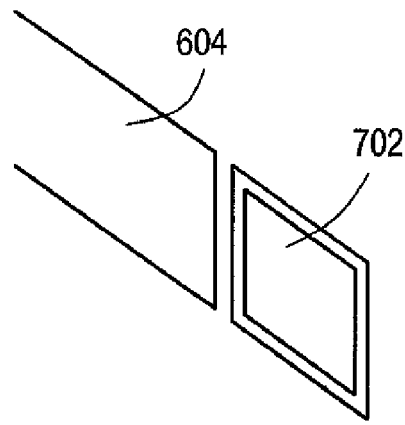
FIG. 7 is an enlarged isometric view of a portion of a preferred embodiment of a telephone in accordance with the present invention.
Figure 8:
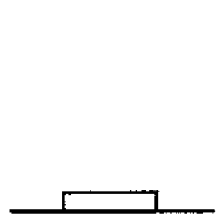
FIG. 8 is a schematic diagram of a preferred embodiment of a button in a rest position in accordance with the present invention.

FIG. 6 shows another embodiment of a telephone 602. Telephone 602 includes a location 604 that is designed to receive a filter cartridge 606. Filter cartridge 606 includes a standard DSL filter. In a preferred embodiment, a first end 608 of filter cartridge 606 includes an electrical connector that is designed to engage a corresponding electrical connector (not shown) disposed within location 604. In other embodiments, the electrical connectors of the filter cartridge 606 could be located on any face or surface of the filter cartridge and provisions would be made in telephone 602 to suitably engage those electrical connectors.

Filter cartridge 606 also has a second end 610. Second end 610 is designed to be accessible after filter cartridge 606 has been installed in telephone 602. Second end 610 includes at least one electrical connector. Preferably, second end 610 includes a DSL connector, and in an exemplary embodiment, second end 610 includes a female DSL connector 612.

After filter cartridge 606 has been installed in telephone 602, second end 610, which includes a DSL connector, is visible and readily accessible. This arrangement provides a convenient system for providing DSL access. Users can plug DSL devices directly into telephone 602 and do not have to search for inconvenient DSL connectors located in walls, behind furniture, and other hard to reach locations.

Figure 9:
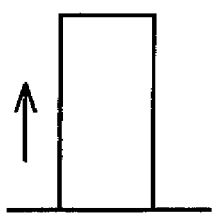
FIG. 9 is a schematic diagram of a preferred embodiment of a button in a deployed position in accordance with the present invention.
Figure 10:
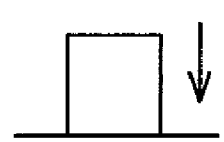
FIG. 10 is a schematic diagram of a preferred embodiment of a button in a pressed position in accordance with the present invention.

Preferably, filter cartridge 606 is designed in a way that makes it easy to remove the filter cartridge 606 from telephone 602. Preferably, an ejection system similar to one used for a PCMCIA slot is utilized. Referring to FIGS. 7-10, the ejection system includes a three position button 702. Button 702 has a rest position (see FIG. 8). From the rest position, when button 702 is pressed, button 702 extends outwards to a deploy position, as shown in FIG. 9. When button 702 is pressed from the deploy position, filter cartridge 606 is ejected from telephone 602.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A telephone comprising:
   a housing;
   POTS circuitry disposed within the housing for establishing telephone calls;
   a location within the housing adapted to engage a filter cartridge, the location including an electrical connector for the POTS circuitry;
   a filter cartridge adapted to be inserted into the location and including a first end and second end, the first end being inserted into the location;
   the first end including at least one electrical connector for engaging the corresponding electrical connector for the POTS circuitry disposed in the location;
   the second end including at least one first connector for receiving a DSL line and at least one second connector for receiving a telephone line, wherein the second end is configured to accept the DSL line and the telephone line simultaneously; and
   wherein the filter cartridge comprises
      a block to receive a signal through the at least one second connector of the second end that contains both DSL and POTS signals and to split the signal, and
      a filter to filter the signal so as to pass substantially only the POTS signal to the at least one electrical connector of the first end, and to simultaneously pass the DSL signal to the at least one first connector of the second end for receiving the DSL line.

2. The telephone according to claim 1, wherein the filter cartridge includes a latch with a shoulder, wherein the location includes a latch with a shoulder, and wherein the shoulder of the latch engages the shoulder of the location to fix the cartridge within the location.

3. The telephone according to claim 1, wherein the filter cartridge is designed to be easily removable.

4. The telephone according to claim 1, wherein the telephone is designed to easily eject the filter cartridge.

5. The telephone according to claim 4, wherein a three position switch is used to eject the filter cartridge.

6. A filter cartridge adapted for use with a telephone comprising:
   a first end and second end, the first end being adapted to be inserted into a location within a housing of the telephone;
   the first end including at least one electrical connector for engaging a corresponding electrical connector within the telephone that is for carrying POTS signals to POTS circuitry of the telephone; and
   the second end including at least one DSL connector for receiving a DSL line and at least one line connector for receiving a telephone line where the at least one line connector receives a signal containing both POTS and DSL signals, and wherein the second end is configured to accept the DSL line and the telephone line simultaneously, and wherein the cartridge includes:
      a block to split the POTS and DSL signal and
      a filter to remove unwanted noise and signals out of the signal received via the at least one line connector so as to output substantially only the POTS signal through the at least one electrical connector of the first end and output the DSL signal through the at least one DSL connector of the second end.

7. The filter cartridge according to claim 6, wherein the filter cartridge includes a latch having a shoulder that engages a shoulder of the location of the telephone.

8. The filter cartridge according to claim 6, wherein the filter cartridge is designed to be easily removable.

9. The filter cartridge according to claim 6, wherein the second end of the filter cartridge includes a female DSL connector.

10. A filter cartridge adapted for use with a telephone comprising:
    a first end and second end, the first end being adapted to be inserted into a location within a housing of the telephone;
    the first end including at least one electrical connector for engaging a corresponding electrical connector within the telephone that is for carrying POTS signals to POTS circuitry of the telephone;
    the second end including at least one line connector capable of receiving a telephone signal that contains both POTS and DSL signals and a DSL connector for connecting with a DSL line, the line connector in communication with a block that splits the signal, the block in communication with a filter that removes the DSL signal so as to output substantially only a POTS signal through the at least one electrical connector of the first end, and the DSL connector in communication with the block to simultaneously receive the DSL signal; and
    wherein the filter cartridge is removable from the telephone, and
    wherein the second end is configured to accept the DSL line and the telephone line simultaneously.

11. The filter cartridge according to claim 10, further comprising a three position switch that is used to eject the filter cartridge from the location.

12. The filter cartridge according to claim 11, wherein the three position switch has a rest position, wherein depressing the switch from the rest position causes the switch to extend, and wherein depressing the switch when extended causes the filter cartridge to be ejected.

13. The filter cartridge according to claim 10, wherein four conductors are used to place the block in communication with the DSL connector.

14. The filter cartridge according to claim 13, wherein a first pair of the four conductors are in communication with an inner pair and wherein a second pair of the four conductors are in communication with an outer pair.

15. The filter cartridge according to claim 10, further comprising a latch.

16. The filter cartridge according to claim 15, wherein the latch is biased away from the filter cartridge.

17. The filter cartridge according to claim 15, wherein the latch includes a shoulder.

18. The filter cartridge according to claim 15, wherein the latch includes an end disposed axially beyond a leading edge of the filter cartridge.

* * * * *